June 27, 1961  W. E. GILMAN  2,989,824
CUT-OFF MACHINES
Filed Jan. 30, 1958  5 Sheets-Sheet 2
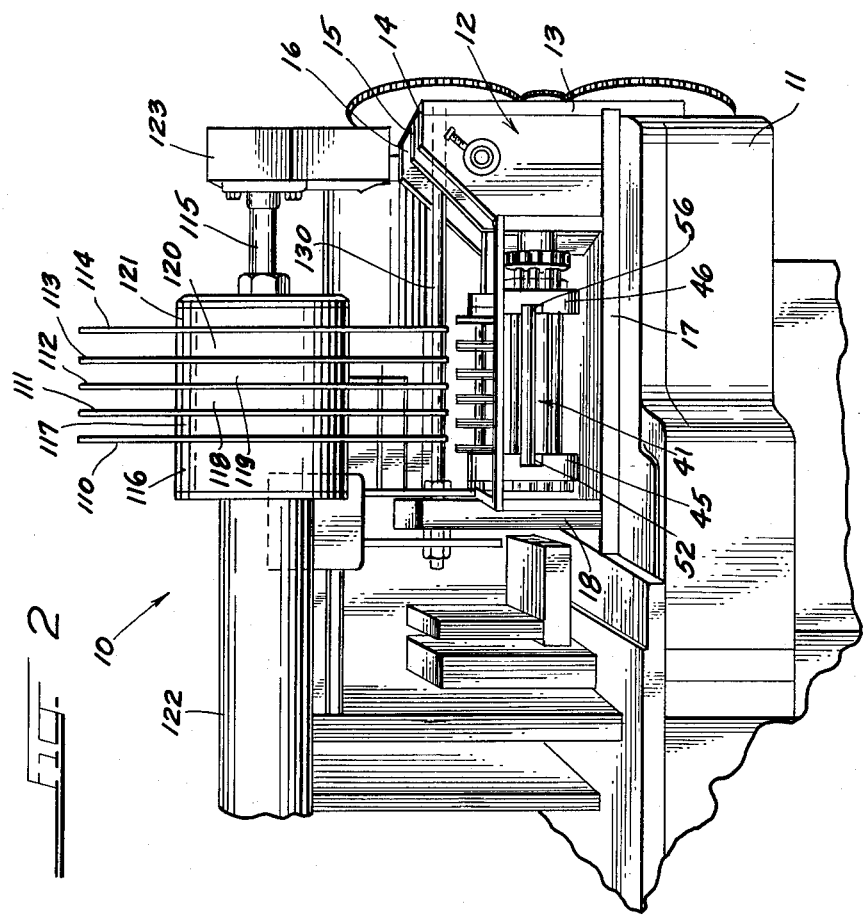
INVENTOR.
WEBSTER E. GILMAN
BY
*Wallace and Cannon*
ATTYS.

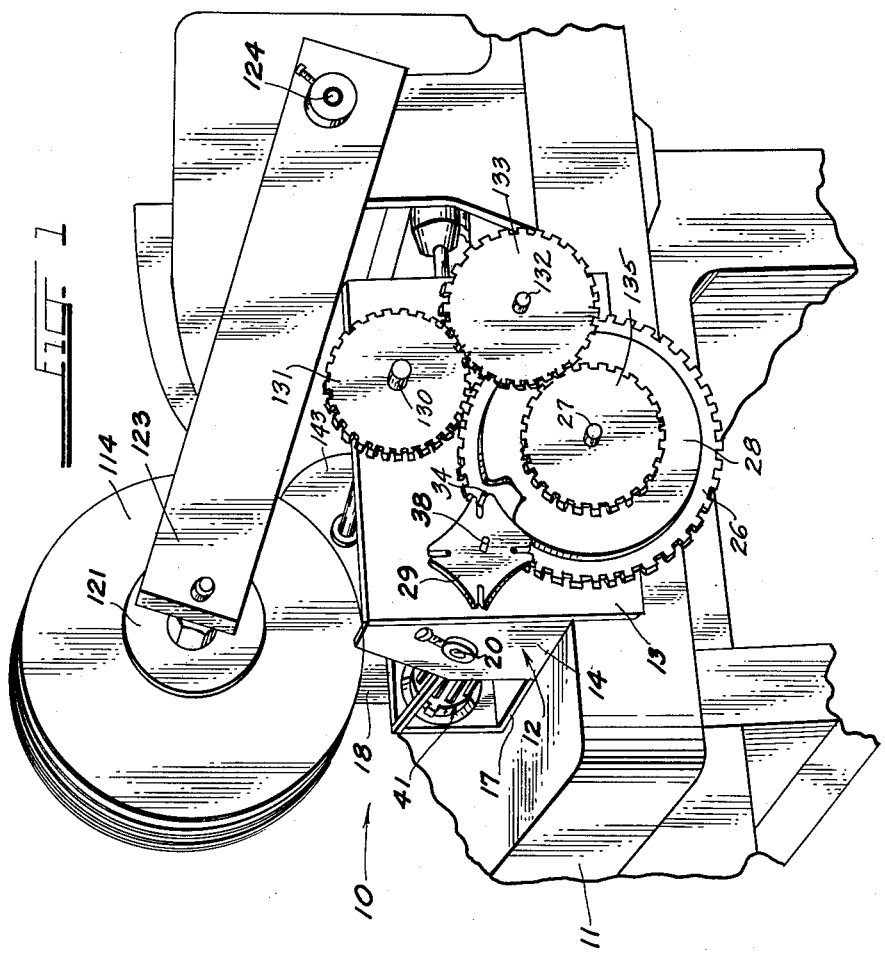

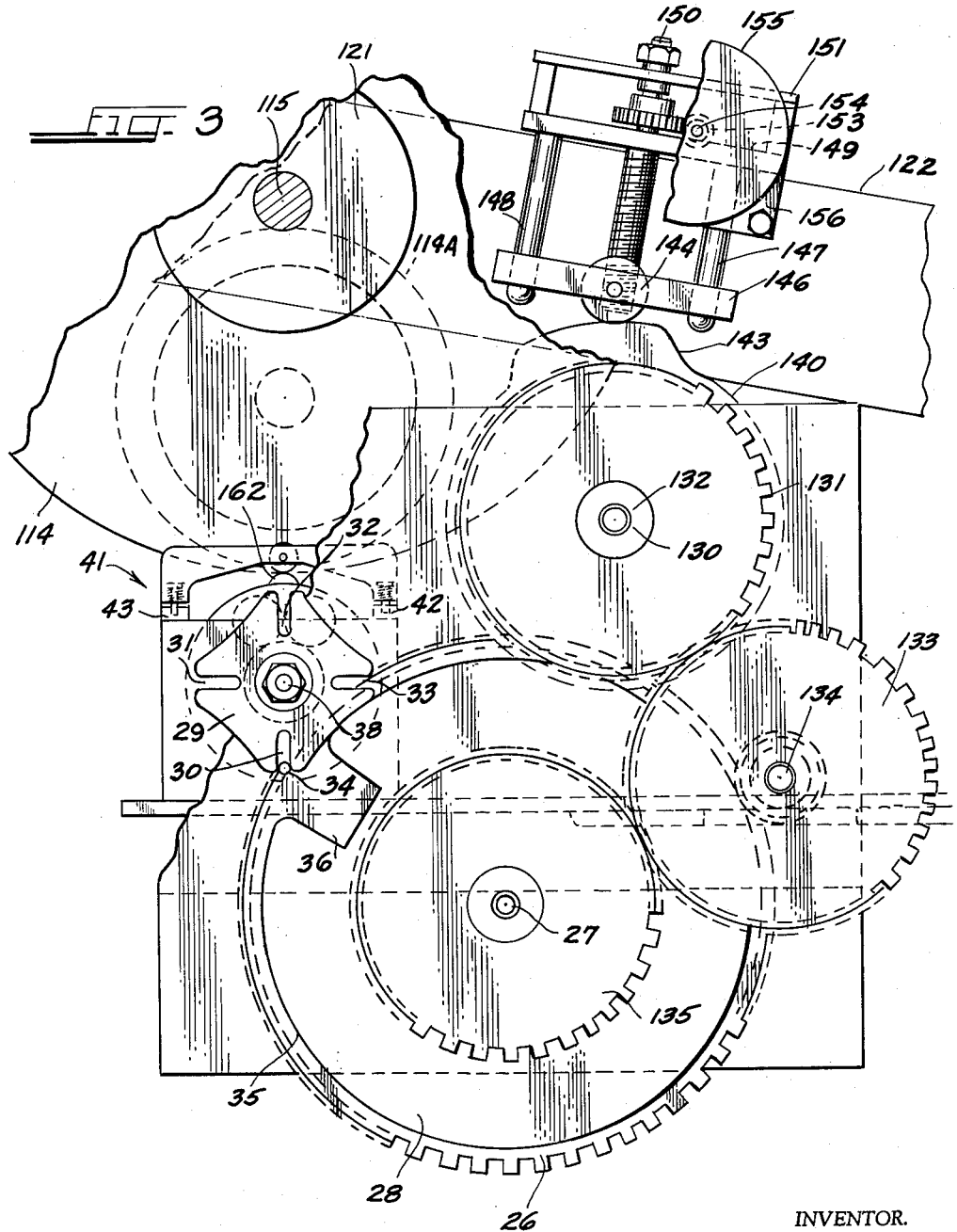

June 27, 1961 W. E. GILMAN 2,989,824
CUT-OFF MACHINES
Filed Jan. 30, 1958 5 Sheets-Sheet 4
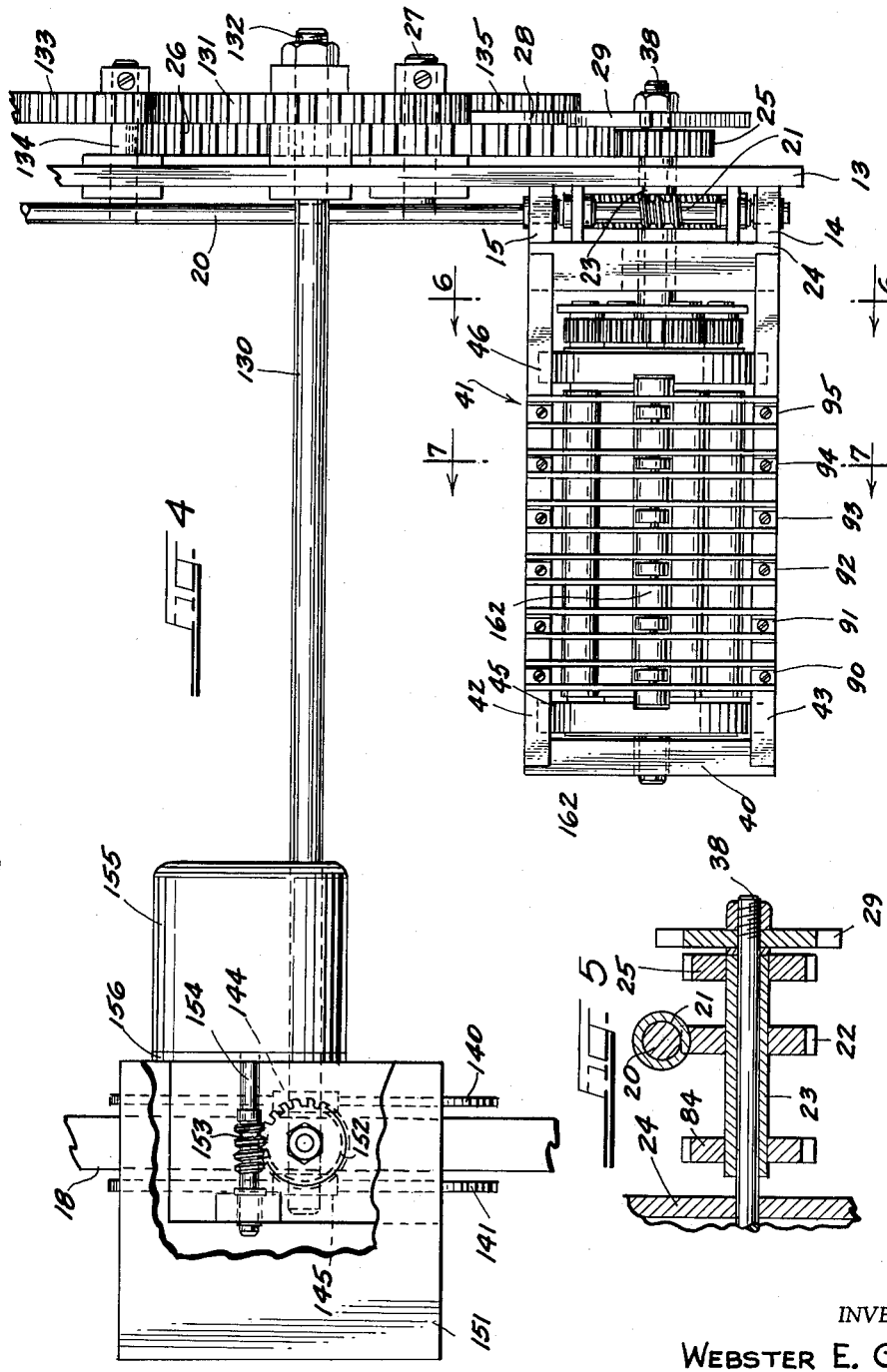
INVENTOR.
WEBSTER E. GILMAN
BY
Wallace and Cannon
Attys.

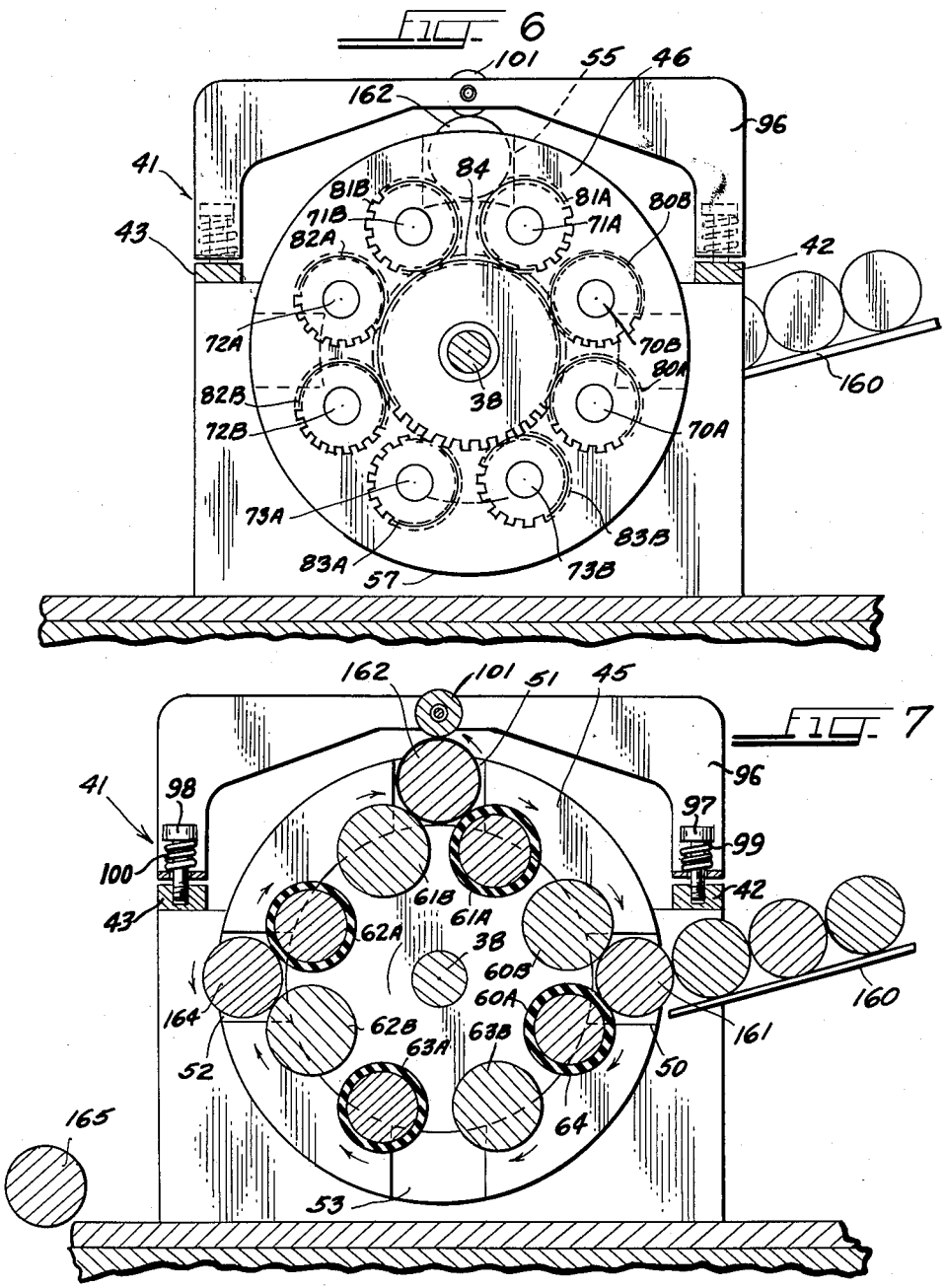

United States Patent Office 2,989,824
Patented June 27, 1961

2,989,824
CUT-OFF MACHINES
Webster E. Gilman, 1423 Thatcher Ave., River Forest, Ill.
Filed Jan. 30, 1958, Ser. No. 712,200
11 Claims. (Cl. 51—108)

This invention relates to a new and improved cut-off machine and particularly to a multiple cut-off machine adapted for use in the manufacture of rod-type magnets and like articles. The invention further relates to a work-positioning apparatus which may be incorporated in a multiple cut-off machine.

There are numerous devices which utilize relatively small bar or rod type permanent magnets and which require at least some degree of precision in the dimensions of the magnets. A typical example of a device of this kind is a permanent-magnet speaker, which may require that the length of the magnet be held within relatively close tolerances. The Alnico permanent magnet alloys frequently utilized in fabricating these permanent magnets are extremely hard and are quite difficult to machine. Indeed, grinding is in most instances the only practical machining method available for cutting or otherwise shaping the permanent magnets.

There are a number of fabrication techniques which may be followed in manufacturing small rod or bar type magnets of this kind. It is of course possible to cast individual magnets to the approximate desired size and configuration and subsequently to grind those surfaces of the magnets which must be held within relatively small tolerance ranges. On the other hand, elongated bars or rods of the permanent magnet alloy may be cut off by repeated use of a grinding wheel to form the desired relatively small permanent magnets. The initial fabrication, using this latter technique, is considerably more economical than the casting of individual small magnets; on the other hand, previously known cut-off machines capable of machining the extremely hard Alnico alloys have been relatively slow and inefficient in operation. Moreover, there has not been available any cut-off machine capable of simultaneously cutting a series of segments from a single bar or rod of these alloys with any degree of precision and accuracy in the cut-off edges.

A primary object of the invention, therefore, is a new and improved multiple cut-off machine which may be utilized in the machining of rod-type magnets and like relatively hard alloys.

Another object of the invention is a new and improved multiple cut-off machine capable of effecting a series of cuts in a rod of an extremely hard permanent magnet alloy or the like and which affords accurate control over the dimensions and configurations of the cut surfaces.

An additional object of the invention is a new and improved multiple cut-off machine which may be utilized in the manufacture of rod-type magnets and which inherently avoids excessive breakage of the brittle magnet alloys.

An additional object of the invention is a multiple cut-off machine adapted to produce a relatively high output of rod-type permanent magnets from elongated rod stock.

A further object of the invention is a new and improved work-positioning apparatus which may be employed in a multiple cut-off machine for the manufacture of rod-type permanent magnets and like objects of relatively hard material.

Another object of the invention is a new and improved work-positioning apparatus for a multiple cut-off machine which effectively and efficiently feeds the work pieces to a cut-off station.

Another object of the invention is a new and improved multiple cut-off machine which effectively and inherently compensates for wear on the cutting elements thereof.

Other and further objects of the present invention will be apparent from the following description and claims and are illustrated in the accompanying drawings which, by way of illustration, show a preferred embodiment of the present invention and the principles thereof and what is now considered to be the best mode for applying those principles. Other embodiments of the invention embodying the same or equivalent principles may be used and structural changes may be made as desired by those skilled in the art without departing from the present invention.

In the drawings:

FIG. 1 is a perspective view of a cut-off machine constructed in accordance with one embodiment of the invention, taken from the front of the machine;

FIG. 2 is a perspective view of the cut-off machine as seen from one side thereof;

FIG. 3 is an enlarged front elevation view of the drive apparatus and work-positioning apparatus of the cut-off machine with portions of the apparatus cut away;

FIG. 4 is a plan view of the work-holding and drive apparatus of the cut-off machine;

FIG. 5 is an enlarged detail view of a portion of the drive apparatus, shown in cross section;

FIG. 6 is a sectional view of the work-holding apparatus taken along line 6—6 in FIG. 4; and FIG. 7 is a further sectional view of the work-holder apparatus taken along line 7—7 in FIG. 4.

FIGS. 1 and 2 illustrate a multiple cut-off machine 10 which is adapted to be utilized in the manufacture of rod-type permanent magnets and in other machining operations entailing accurate cutting of other extremely hard materials. The cut-off machine 10 affords a high output and is automatic in operation, making possible the economical and expeditious machining of rod-type Alnico magnets and like articles. At the same time, the multiple cut-off machine 10 affords a highly accurate cutting operation, making it possible to maintain relatively close tolerances in the cut-off operation.

The cut-off machine 10 comprises a bed 11 upon which the principal components of the machine are mounted. A vertical frame 12 is secured to the machine bed 11; this frame 12 comprises an end plate 13 and three side plates 14, 15, and 16 which serve as braces for the end plate. In addition, the frame 12 may include a base plate 17 affixed to the bed 11 and a second end plate or mounting block 18 which is disposed on the base plate 17 in spaced relation to end plate 13.

A main drive shaft 20 is included in the multiple cut-off machine 10 and is journalled in the side plates 14–16 as indicated in FIG. 4; thus, the drive shaft 20 extends substantially parallel to the end plate 13. This drive shaft is connected to an electric motor or other suitable power source, the motor or other power source not being shown in the drawings. A worm gear 21 is affixed to the drive shaft 20 for rotation therewith and is disposed in meshing engagement with a spur gear 22 mounted upon a second drive shaft 23 as indicated in FIGS. 4 and 5. The shaft 23, which is of tubular configuration, is journalled in the end plate 13 and in a mounting block or frame member 24 which is supported upon the base plate 17 of the frame 12. A second spur gear 25 is affixed to the shaft 23 for rotation therewith and is disposed in meshing engagement with a relatively large spur gear 26 mounted upon a stud shaft 27, the shaft 27 being journalled in the end plate 13.

A Geneva wheel 28 is also affixed to the shaft 27 for rotation therewith and is aligned with a Geneva sprocket 29. The sprocket 29 is of conventional configuration and is provided with four slots 30, 31, 32 and 33 which are adapted to engage the pin 34 of the Geneva wheel 28. The Geneva wheel 28 is provided with the usual cam surface 35 having a slot 36 therein aligned with the pin 34. The Geneva sprocket 29 is affixed to a shaft 38 which is mounted concentrically with the shaft 23, being disposed within the hollow central portion of the shaft 23. The internal shaft 38 extends through the frame member 24, the opposite end of the shaft being journalled in a frame member 40.

The cut-off machine 10 further includes a plural-position jig 41 which is mounted between the two frame members 24 and 40 and which is actuated, as described more fully hereinafter, by the concentric shafts 23 and 38. The jig 41, which is best illustrated in FIGS. 3, 4, 6 and 7, comprises the two frame members 24 and 40 and a pair of transverse frame members 42 and 43 which interconnect members 24 and 40. The jig further includes a pair of rotatable end plates 45 and 46 which are affixed to the shaft 38 for rotation therewith and are thus mounted between the frame members 24 and 40 for rotation about the axis of the shaft. The end plate 45, as best indicated in FIG. 7, is provided with four slots 50, 51, 52, and 53 which are equally spaced about the periphery of the end plate. Preferably, and as best indicated in FIG. 2, the end plate slots such as the slot 52 shown therein do not extend through the entire thickness of the end plate but rather afford an abutment wall to limit longitudinal movement of a work piece located in the slot as described more fully hereinafter. Moreover, the end plate 46 may also be provided with a corresponding series of slots 54, 55, 56, and 57, as shown in FIG. 7, which are aligned with the slots 50-53 in end plate 45.

The plural-position jig 41 further includes a plurality of pairs of rollers which are uniformly located, both angularly and radially, with respect to the axis of the jig shaft 38. As best seen in FIG. 7, the first pair of jig rollers 60A and 60B is aligned with the slot 50, the second pair of rollers 61A and 61B is associated with the end plate slot 51, the third pair of rollers 62A, 62B is aligned with the slot 52, and the fourth pair of rollers 63A, 63B is associated with the slot 53 in the end plate 45. The alignment of the rollers is of course similar with respect to the slots 54-57 in the end plate 46, since the two sets of end plate receptacles or slots are aligned with each other. The rollers 60A and 60B of the first pair of jig rollers may be fabricated from steel and may be of unitary construction or may each include a shaft and a separate replaceable cylindrical member mounted on that shaft. Preferably, however, at least one of the rollers is provided with a frictional coating or surface member such as the hard rubber sleeve 64 on the roller 60A. In some instances, it may be necessary to provide all of the rollers in the jig with a high friction surface as by means of a sleeve or coating of hard rubber or other friction material, depending to some extent upon the surface characteristics of the rod material to be fabricated by means of the jig and the other components of the multiple cut-off machine 10.

Each of the jig rollers is journalled between the two end plates 45 and 46 of the plural-position jig 41; moreover, each of the rollers includes a shaft extension which projects beyond the end plate 46 as generally illustrated in FIG. 2. In FIG. 6 the shaft extensions of the several rollers 60A, 60B, 61A, 61B, 62A, 62B, 63A and 63B are designated by reference numerals 70A, 70B, 71A, 71B, 72A, 72B, 73A and 73B respectively. A corresponding series of spur gears 80A, 80B, 81A, 81B, 82A, 82B, 83A and 83B are individually affixed to the shaft extensions for rotation therewith. Each of these spur gears is disposed in meshing engagement with a pinion gear 84, the gear 84 being affixed to the shaft 23 for rotation therewith as indicated in FIG. 5. Thus, the individual spur gears mounted upon the rollers of the multiple-position jig may be driven continuously from the shaft 23 for a purpose to be described more fully hereinafter.

The two longitudinal frame members 42 and 43 of the jig 41 are utilized to support a plurality of resilient biasing members which are disposed at spaced intervals along the length of the jig. As indicated in FIG. 4, in the illustrated embodiment of the invention there are six such biasing members 90, 91, 92, 93, 94, and 95, each of which extends transversely of the jig and is secured to the two frame members 42 and 43. The construction of the member 94, which is typical of the biasing members, is shown in detail in FIGS. 4 and 7; the biasing member comprises a substantially U-shaped sheet metal support member 96 mounted upon the frame members 42 and 43 by means of a pair of studs 97 and 98 respectively. A pair of springs 99 and 100 are disposed in encompassing relation to the studs 97 and 98 respectively. These springs bias the support member 96 downwardly toward the frame members 42 and 43 but permit limited upward movement of the support member with respect to the two frame members. A relatively small roller 101 is mounted at the center of the support member 96 and is located immediately above the slot 51 when the rotary portion of the jig is in the position illustrated in FIG. 7.

The cut-off machine 10 further includes a plurality of cutting devices 110, 111, 112, 113 and 114. These cutting devices may comprise conventional grinding wheels capable of cutting relatively hard metals such as the Alnico alloys used in the fabrication of permanent magnets. The cutting wheels 110-114 are individually mounted upon a common shaft 115 for rotation therewith and are maintained in predetermined spaced positions along that shaft by means of a plurality of spacer members 116, 117, 118, 119, 120 and 121 (see FIG. 2). The shaft 115 is supported between a main support member 122 and a secondary or outrigger support member 123, both of the support members 122 and 123 being mounted for pivotal movement about a common shaft 124 as indicated in FIG. 1. A suitable drive motor or other drive device is mechanically connected to the shaft 115 in conventional manner to rotate the cutting wheels 110-114; inasmuch as the drive arrangement for the cutting wheels is not critical, it has not been illustrated in the drawings. The cutting wheels 110-114 are aligned with the spaces between the resilient biasing members 90-95, as clearly indicated in FIGS. 2 and 4.

Cut-off machine 10 also includes means for moving the cutting wheels 110-114 between a normal position in which the wheels are displaced from the cutting station of the jig 41 and a cutting position in which they are effective to sever a work piece held in the jig. The apparatus for controlling movement of the cutting wheels comprises a drive shaft 130 (FIGS. 3 and 4) which is journalled in the frame member 13 of the machine and which extends outwardly of the frame member 13. A spur gear 131 is mounted upon the extension portion 132 of the shaft 130 and is disposed in meshing engagement with an idler gear 133 mounted upon a stub shaft 134, the stub shaft 134 being journalled in the frame member 13. The idler gear 133, in turn, is disposed in meshing engagement with a spur gear 135 which is affixed to the shaft 27 for rotation therewith. The opposite end of the shaft 130 is journalled in the mounting block 18, a pair of cams 140 and 141 being affixed to the shaft 130 on opposite sides of the mounting block. The two cams 140 and 141 are similar in configuration and are each provided with a single lobe, as indicated by the lobe 143 on the cam 140 in FIG. 3.

The two cams 140 and 141 are engaged by a pair of cam follower rollers 144 and 145 respectively. These two cam follower rollers are rotatably mounted upon a frame member 146 for rotational movement about a common axis. The frame member 146 engages a pair of guides 147 and 148 affixed to a mounting plate 149, the mounting plate in turn being secured to the principal support member 122 for the cutting wheels of the cut-off machine. A lead screw 150 is journalled in and extends downwardly from the mounting plate 149 into a suitable threaded opening in the frame member 146, thereby affording a support means for the frame member. The upper portion of the lead screw 150 may be suitably supported from an upper mounting plate 151 which is mounted in fixed spaced relation to the mounting plate 149.

A gear 152 is mounted upon the upper portion of the lead screw 150 for rotation therewith and is engaged by a suitable worm gear 153 mounted upon a drive shaft 154. The shaft 154 is the output shaft of a small electrical motor 155 which is mounted upon the mounting plates 149 and 151 by suitable means such as a bracket 156. The motor 155 is preferably continuously energized during operation of the cut-off machine for a purpose to be described more fully hereinafter. It should be understood that advancement of the lead screw 150 may be accomplished by a manual adjustment controlled by the machine operator or by other suitable means, instead of the motor 155, if desired.

The operation of the cut-off machine 10 in fabricating a plurality of small rod type magnets or like articles from a relatively hard and brittle work piece of rod stock is almost completely automatic in nature. When the machine is placed in operation, the main drive shaft 20 is driven continuously and, as a consequence, the external shaft 23 is also driven continuously. Consequently, the drive connection between the shaft 23 and the jig rollers afforded by the pinion gear 84 and the individual spur gears on the rollers causes the jig rollers to be continuously rotated as indicated in FIG. 7. With the jig in the position shown in FIG. 7, a piece of rod stock is fed down an inclined ramp 160 into the slots 50 and 54 in the two end plates 45 and 46. This piece of rod stock, designated by the reference numeral 161, is not in position to be cut and, consequently, no cutting operation is performed in the first cycle of operation of the machine.

Continued rotation of the shaft 23, however, causes a much slower rotation of the shaft 27 by virtue of the drive connection afforded by the gears 25 and 26. Consequently, the Geneva wheel 28 is rotated at a relatively low rate of speed, as compared to rotation of the shaft 23, until the pin 34 of the Geneva movement engages in one of the slots of the Geneva sprocket 29. FIG. 3 shows the mechanism as it appears at the time that the pin 34 engages in the slot 30 of the sprocket.

The continued clockwise movement of the Geneva wheel 28 and the engagement of the pin 24 in the slot 30 rotates the Geneva sprocket 29 through an arc of 90°, after which the pin 34 is disengaged from the sprocket and the sprocket is locked in its 90° displaced position by engagement with the external surface 35 of the Geneva wheel 28. This quarter-revolution movement of the Geneva sprocket imparts a similar rotational movement to the internal shaft 38 of the jig 41, bringing the work piece in the jig to the cutting position as indicated by the work piece 162 in FIGS. 6 and 7. In this position, the work piece 162 is engaged by each of the rollers of the individual resilient biasing devices 90-95, as indicated by the roller 101 in FIGS. 6 and 7. Consequently, the work piece 162 is continuously rotated, since the biasing rollers maintain the work piece in frictional contact with continuously rotating rollers such as rollers 61A and 61B.

During the time that the work piece is in the cutting position as indicated by the bar 162 in FIGS. 6 and 7, it is effectively severed into several pieces as described more fully hereinafter. A substantial period of time is allowed for this cutting operation, being determined by the speed of rotation of the Geneva movement comprising the Geneva wheel 28 and the sprocket 29. For Alnico rod stock of a diameter of the order of one half to one inch, this time may be approximately ten to fifteen seconds.

Continued operation of the machine subsequently cause the Geneva mechanism to rotate through another quarter revolution, advancing the severed pieces of rod stock to the position indicated by reference numeral 164 in FIG. 7. As the jig 41 approaches this position, the individual magnets or other articles are discharged from the jig, falling downwardly therefrom as indicated at 165 to a suitable receiving hopper or conveyor (not shown). Thereafter, on the next quarter revolution of the jig, the jig advances to an idle position and thence, upon the next quarter revolution, back to the original position shown in FIG. 7. Thus, upon each of the intermittent quarter revolution movements of the Geneva movement controlling overall rotation of the jig 41, a new work piece is advanced into the jig, a work piece already in the jig is severed into the desired fractional parts, and parts severed on a previous operation are discharged from the jig.

Movement of the cutting wheels 110-114 into and out of cutting position is controlled by the two cams 140 and 141 which are driven from the shaft 130. The drive connection for the shaft 130 is such that that shaft is driven through one complete revolution during each revolution of the Geneva wheel 28. The initial or starting position of the cutting wheel control apparatus is illustrated in FIG. 3, which shows the cam follower roller 144 riding upon the extension lobe 143 of the cam 140. At the same time, of course, the cam follower roller 145 engages the corresponding lobe of the cam 141 (see FIG. 4). As long as the cam follower rollers are engaged with the extension lobes of the cams, the cutting wheel support member 122 is maintained in elevated position and the cutting wheels are held above a work piece in the jig such as the work piece 162 in FIG. 3.

Continued rotation of the shaft 130, however, brings the cam follower rollers 144 and 145 into engagement with the reduced-diameter portions of the two cams 140 and 141. Consequently, the cutting wheel support arm 122 is no longer maintained in its elevated position, but is released, permitting the grinding wheels to engage and to cut the work piece. The grinding wheels cut the work piece in conventional manner and move downwardly through a relatively short distance during the cutting process, which is completed before the cam follower rollers again engage the elevated lobes of the two cams. The reduced-diameter portions of the cams prevent excessive downward movement of the grinding wheels and thereby prevent the cutting devices from damaging the jig 41. Preferably, the contour of the two cams 140 and 141 is made such that the downward movement of the cutting wheels is limited to a distance only slightly in excess of one half the diameter of the work piece being cut to prevent damage to the jig rollers.

In the cutting of extremely hard and brittle materials such as Alnico alloys, the cutting devices such as the grinding wheels 110-114 wear rather rapidly, continually reducing the diameter of the grinding wheels. If the machine does not include a means for compensating for this wear, the effectiveness of the machine is substantially reduced. Thus, even a relatively small reduction in diameter of the grinding wheels may prevent them from reaching the center of the work piece in the course of a cutting action and thus may preclude effective operation of the machine. In the cut-off machine 10, however, compensation for wear of the cutting wheels is effectively provided by the mounting arrangement for the cam follower rollers 144 and 145. Thus, during operation of the machine, the auxiliary motor 155 may be continuously or intermittently energized, thereby driving the lead screw 150 through the drive connection afforded by the worm gear 153 and the associated gear 152 on the lead screw. The speed of rotation of the lead screw is relatively low and the threads on the lead screw are given a relatively small pitch in order that the frame 146 may be moved slowly upwardly along the guides 147 and 148. This slow upward movement of the frame member 146 continuously extends the downward limit of movement of the support arm 122 and thus of the cutting wheels 110–114. Consequently, even though the cutting wheels may be reduced in diameter as indicated by dash outline 114A in FIG. 3, the machine is automatically and effectively adjusted to permit engagement of the cutting wheels with the work piece on each cycle of operation of the machine. It is not possible to specify precisely the rotational speed of the lead screw 159 and the thread pitch for the lead screw for all machine operations, since these factors are dependent to a substantial extent upon the wearing characteristics of the grinding wheels 110–114 and may also change somewhat in the processing of work pieces of differing hardness. For grinding wheels of a given type, however, and for work pieces of given hardness, it is not difficult to determine the downward rate of advance necessary to maintain the cutting wheels in effective operating position with respect to the work piece as the cutting wheels are worn away.

It is thus seen that the multiple cut-off machine of the invention affords a relatively high output, yet is capable of operating upon extremely hard materials such as permanent magnet alloys or the like. Because the work pieces are continuously rotated in the jig 41, the cut surfaces are flat within relatively close tolerances, thereby affording materially improved accuracy with respect to the dimensions and configurations of these surfaces as compared with previously known cut-off machines. All parts of the work piece are effectively held in position in the jig during the cutting operation, thereby preventing damage to the severed magnets or other articles in the event that one cut is completed before another. No special feeding apparatus is required to position work pieces in the jig of the cut-off machine; rather, an extremely simple gravity feed arrangement is sufficient for both the input and output requirements of the machine. Moreover, the machine is highly versatile, since it may be adapted to accept work pieces of varying diameter simply by adjusting the height of the resilient biasing members 90–95 to afford an effective biasing action with respect to different size work pieces. This adjustment may be conveniently achieved by interposing one or more washers between each of the biasing members and the frame members of the jig. By the same token, the number and length of the severed pieces may be conveniently changed simply by changing the spacers between the cutting wheels and by relocating the biasing members on the jig 41.

While preferred embodiments of the invention have been described and illustrated, it is to be understood that these are capable of variation and modification. Accordingly, the aim in the appended claims is to cover all such variations and modifications as may fall within the true spirit and scope of the invention.

I claim:

1. A multiple cut-off machine for use in the manufacture of rod magnets and other relatively hard, brittle materials, comprising: a plural-position jig including a given number of pairs of rollers uniformly located, angularly and radially, with respect to a common axis; drive means for intermittently rotating said jig about said axis to bring said pairs of rollers sequentially to a cut-off station and for continuously rotating said rollers about their individual axes; a plurality of resilient biasing members, positioned at said cut-off station and distributed in spaced relation along said jig, for maintaining a piece of rod stock in frictional rolling contact with the pair of rollers instantaneously located at said cut-off station; a plurality of cutting devices comprising rotatable grinding wheels individually aligned with the spaces between said biasing members; means for continuously rotating said grinding wheels; and means for moving said cutting devices between an initial position displaced from said cutting station and a cutting position at said cutting station in coordination with the intermittent rotary movement of said jig.

2. A multiple cut-off machine for use in the manufacture of rod magnets and other relatively hard, brittle materials comprising: a plural-position jig including a given number of pair of rollers uniformly located, angularly and radially, with respect to a common axis; drive means for intermittently rotating said jig about said axis to bring said pairs of rollers sequentially to a cut-off station and for continuously rotating said rollers about their individual axes; a plurality of resilient biasing members, positioned at said cut-off station and distributed in spaced relation along said jig, for maintaining a piece of rod stock in frictional rolling contact with the pair of rollers instantaneously located at said cut-off station; a plurality of cutting devices comprising rotatable grinding wheels individually aligned with the spaces between said biasing members; drive means for said cutting devices; means for moving said cutting devices between a normal position displaced from said cutting station and a cutting position at said cutting station in co-ordination with the intermittent rotary movement of said jig; and adjustable limit means for limiting travel of said cutting devices into said cutting station.

3. A multiple cut-off machine for use in the manufacture of rod magnets and other relatively hard, brittle materials comprising: a plural-position jig including a given number of pair of rollers uniformly located, angularly and radially, with respect to a common axis; drive means, including a Geneva movement, for intermittently rotating said jig about said axis to bring said pairs of rollers sequentially to a cut-off station and for continuously rotating said rollers about their individual axes; a plurality of resilient biasing members, positioned at said cut-off station and distributed in mutually equally spaced relation along the length of said jig, for maintaining a piece of rod stock in frictional rolling contact with the pair of rollers instantaneously located at said cut-off station; a plurality of co-axially mounted grinding wheels individually aligned with the spaces between said biasing members; drive means for rotating said grinding wheels; means for moving said wheels between a normal position displaced from said cutting station and a cutting position at said cutting station in co-ordination with the intermittent rotary movement of said jig; and adjustable limit means for limiting travel of said grinding wheels into said cutting station.

4. A multiple cut-off machine for use in the manufacture of rod magnets and other relatively hard, brittle materials comprising: a plural-position jig including a given number of pairs of rollers uniformly located, angularly and radially, with respect to a common axis; drive means for intermittently rotating said jig about said axis to bring said pairs of rollers sequentially to a cut-off station and for continuously rotating said rollers about their individual axes; a plurality of resilient biasing members, positioned at said cut-off station and distributed in spaced relation along said jig, for maintaining a piece of rod stock in frictional rolling contact with the pair of rollers instantaneously located at said cut-off station; a plurality of co-axially mounted cutting devices comprising grinding wheels individually aligned with the spaces between said biasing members; means for continuously rotating said cutting devices; means for moving said cutting devices between a normal position displaced from said cutting station and a cutting position at said cutting station in co-ordination with the intermittent rotary movement of said jig; adjustable limit means for limiting travel of said cutting devices into said cutting station; and means, mechanically connecting said drive means and said limit means, for continuously adjusting said limit means with continued operation of said drive means.

5. In a multiple cut-off machine for use in the manufacture of rod magnets and other relatively hard, brittle materials, a work-positioning apparatus comprising: a plural-position jig including a given number of pairs of rollers uniformly located, angularly and radially, with respect to a common axis; drive means for intermittently rotating said jig about said axis to bring said pairs of rollers sequentially to a cut-off station and for continuously rotating said rollers about their individual axes; a plurality of resilient biasing members, positioned at said cut-off station and distributed in mutually spaced relation along the length of said jig, for maintaining a piece of rod stock in frictional rolling contact with the pair of rollers instantaneously located at said cut-off station, and means for moving a cutting device toward and away from said cut-off station in coordination with the intermittent rotary movement of said jig.

6. In a multiple cut-off machine for use in the manufacture of rod magnets and other relatively hard, brittle materials, a work-positioning apparatus comprising: a plural-position jig including a frame, a first drive shaft journalled in said frame, a pair of support members mounted on said first drive shaft for rotation therewith, and a given number of pairs of rollers journalled between said support members and uniformly located, angularly and radially, with respect to said shaft; drive means for intermittently rotating said jig about said axis to bring said pairs of rollers sequentially to a cut-off station and for continuously rotating said rollers about their individual axes, said drive means comprising a corresponding number of spur gears individually mounted on said rollers, a continuously rotating second drive shaft, a pinion gear mounted on said second drive shaft for rotation therewith and disposed in meshing engagement with said spur gears, and a Geneva movement interconnecting said drive shafts; and a plurality of resilient biasing members, mounted on said frame adjacent said cut-off station and distributed in spaced relation along the length of said jig, for maintaining a piece of rod stock in frictional rolling contact with the pair of rollers instantaneously located at said cut-off station.

7. In a multiple cut-off machine for use in the manufacture of rod magnets and other relatively hard, brittle materials, a work-positioning apparatus comprising: a plural-position jig including a frame, a pair of support members mounted in spaced relation on said frame for rotation about a common axis, and a given number of pairs of rollers journalled in and extending between said support members and uniformly located, angularly and radially, with respect to said axis; drive means for intermittently rotating said jig about said axis to bring pairs of rollers sequentially to a cut-off station and for continuously rotating said rollers about their individual axes; and a plurality of resilient biasing members, positioned at said cut-off station and distributed in mutually spaced relation along the length of said jig, for maintaining a piece of rod stock in frictional rolling contact with the pair of rollers instantaneously located at said cut-off station, each of said biasing members comprising a support element resiliently mounted on said frame for limited movement with respect thereto and a roller journalled thereon for engaging a piece of rod stock.

8. In a multiple cut-off machine for use in the manufacture of rod magnets and other relatively hard, brittle materials, a work-positioning apparatus comprising: a plural-position jig including a given number of pairs of rollers uniformly located, angularly and radially, with respect to a common axis, at least one roller of each pair having a relatively high-friction surface of rubber or the like; drive means for intermittently rotating said jig about said axis to bring said pairs of rollers sequentially to a cut-off station and for continuously rotating said rollers about their individual axes; a plurality of resilient biasing members, positioned at said cut-off station and distributed in mutually spaced relation along the length of said jig, for maintaining a piece of rod stock in frictional rolling contact with the pair of rollers instantaneously located at said cut-off station, and means for moving a cutting device toward and away from said cut-off station in coordination with the intermittent rotary movement of said jig.

9. In a multiple cut-off machine for use in the manufacture of rod magnets and other hard, brittle materials, a work-positioning apparatus comprising: a plural-position jig including a pair of spaced end plates mounted for rotation about a given axis, at least one of said end plates being provided with four slots equally spaced about the periphery thereof, each of said slots having a closed end effective to abut with an end of a piece of rod stock disposed therein to thereby maintain the rod stock in fixed axial position in said jig, said jig further including four pairs of rollers extending between and journalled in said end plates in alignment with said slots; drive means for intermittently rotating said jig about said axis to bring said pairs of rollers sequentially to a cut-off station at the top of said jig and for continuously rotating said rollers about their individual axes; and a plurality of resilient biasing members, positioned at said cut-off station and distributed in spaced relation along the length of said jig, for maintaining a piece of rod stock in frictional rolling contact with the pair of rollers instantaneously located at said cut-off station.

10. A multiple cut-off machine for use in the manufacture of rod magnets and other hard, brittle materials comprising: a plural-position jig including a pair of spaced end plates mounted for rotation about a given axis, at least one of said end plates being provided with four slots equally spaced about the periphery thereof, each of said slots having a closed end effective to abut with an end of a piece of rod stock disposed therein to thereby maintain the rod stock in fixed axial position in said jig, said jig further including four pairs of rollers extending between and journalled in said end plates in alignment with said slots; drive means for intermittently rotating said jig about said axis to bring said pairs of rollers sequentially to a cut-off station at the top of said jig and for continuously rotating said rollers about their individual axes; a plurality of resilient biasing members, positioned at said cut-off station and distributed in spaced relation along the length of said jig, for maintaining a piece of rod stock in frictional rolling contact with the pair of rollers instantaneously located at said cut-off station; a plurality of cutting devices comprising grinding wheels individually aligned with the spaces between said biasing members; and means for moving said cutting devices between a normal position displaced from said cutting station and a cutting position at said cutting station, including means for maintaining said cutting devices in said normal position whenever said jig is being rotated.

11. A multiple cut-off machine for use in the manufacture of rod magnets and the like comprising: a plural-position jig including a pair of spaced end plates mounted for rotation about a given axis, at least one of said end plates being provided with four slots equally spaced about the periphery thereof, each of said slots having a closed end effective to abut with an end of a piece of rod stock disposed therein to thereby maintain the rod stock in fixed axial position in said jig, said jig further including four pairs of rollers extending between and journalled in said end plates in alignment with said slots; drive means for intermittently rotating said jig about said axis to bring said pairs of rollers sequentially to a cut-off station at the top of said jig, a discharge station displaced 90° from said cut-off station, an idle station at the bottom of said jig, and a feed-in station displaced 90° from said cut-off station, and for continuously rotating said rollers about their individual axes; means for feeding a piece of rod stock into the slot and into contact with the pair of rollers instantaneously located at said feeding station; a plurality of resilient biasing members, positioned at said cut-off station and distributed in spaced relation along the length of said jig, for maintaining a piece of rod stock in frictional rolling contact with the pair of rollers instantaneously located at said cut-off station; a plurality of cutting devices individually aligned with the spaces between said biasing members; and means for moving said cutting devices between a normal position displaced from said cutting station and a cutting position at said cutting station, including means for maintaining said cutting devices in said normal position whenever said jig is being rotated.

References Cited in the file of this patent

UNITED STATES PATENTS

| | | |
|---|---|---|
| 2,272,179 | Allardt | Feb. 10, 1942 |
| 2,321,735 | Clifford | June 15, 1943 |
| 2,521,628 | Britton et al. | Sept. 5, 1950 |
| 2,554,830 | Klett | May 29, 1951 |
| 2,672,682 | Studebaker et al. | Mar. 23, 1954 |
| 2,680,939 | Humes | June 15, 1954 |
| 2,701,015 | Gottschalk | Feb. 1, 1955 |
| 2,704,422 | Norton | Mar. 22, 955 |
| 2,805,521 | Silven | Sept. 10, 1957 |
| 2,881,567 | Whitaker | Apr. 14, 1959 |